(12) United States Patent
Kojima et al.

(10) Patent No.: US 6,236,398 B1
(45) Date of Patent: May 22, 2001

(54) MEDIA SELECTING DEVICE

(75) Inventors: Kunio Kojima, Funabashi; Mamoru Oda, Noda; Takeshi Hashimoto, Chiba, all of (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/019,817

(22) Filed: Feb. 6, 1998

(30) Foreign Application Priority Data

Feb. 19, 1997 (JP) .................................................... 9-034536

(51) Int. Cl.⁷ ........................................................ G06F 3/00
(52) U.S. Cl. .......................... 345/348; 345/349; 345/353; 345/355
(58) Field of Search ..................................... 345/348, 349, 345/352, 353, 355, 356, 357, 339, 327, 370, 184; 348/13, 10

(56) References Cited

U.S. PATENT DOCUMENTS

| | | | |
|---|---|---|---|
| 5,295,243 | 3/1994 | Robertson et al. | 345/348 |
| 5,440,325 | 8/1995 | Edmark, III | 345/145 |
| 5,515,486 | 5/1996 | Amro et al. | 345/349 |
| 5,524,196 | 6/1996 | Blades | 345/326 |
| 5,592,605 | 1/1997 | Asuma et al. | 345/326 |
| 5,627,531 | 5/1997 | Posso et al. | 345/184 |
| 5,898,435 | 4/1999 | Nagahara et al. | 345/352 |

FOREIGN PATENT DOCUMENTS

| | | |
|---|---|---|
| 0767418A1 | 4/1997 | (EP) . |
| 7-49764 | 2/1995 | (JP) . |
| 7-84746 | 3/1995 | (JP) . |
| 7-114451 | 5/1995 | (JP) . |
| 9717661A1 | 5/1997 | (WO) . |

*Primary Examiner*—Raymond J. Bayerl
*Assistant Examiner*—Sy D. Luu

(57) ABSTRACT

A media selecting device enabling a user to easily select any desired one of a plurality of selectable media. The media selecting device according to the present invention can easily select any one of a plurality of hierarchically-related icons by turning a rotary disk-type knob. The user presses a first change-over button to access the icon selected by the disk-type knob, and to display icons of a lower hierarchical layer or to display a deciding medium represented by icons. The user can press a second change-over button to cancel the selected icon, and to display icons of an upper hierarchical layer. Furthermore, the displayed icons have different three-dimensional shape and location information, and are disposed in a three-dimensional virtual space, thus increasing visibility and control of the device.

25 Claims, 14 Drawing Sheets

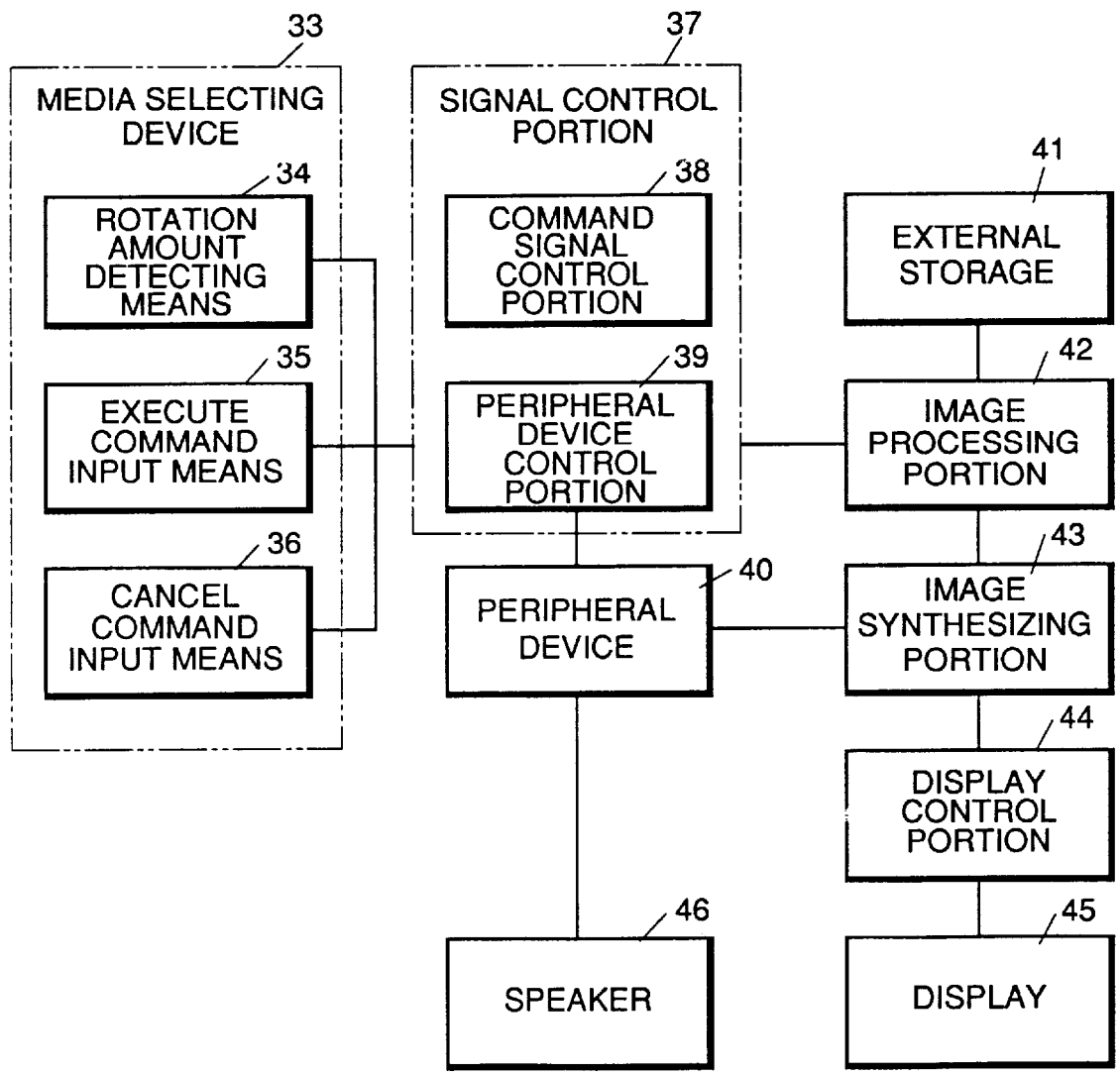

MEDIA SELECTING DEVICE

BACKGROUND OF THE INVENTION

The recent remarkable development of television technology has been reflected in producing television receivers (hereinafter referred to as TV) which have a variety of additional functions. Furthermore, TVs may be used for displaying, besides usual TV broadcasts, a variety of other media such as satellite multichannel broadcast, CS broadcast, television game broadcast, music broadcast "karaoke" and so on. Such multi-function multi-channel TVs may be associated with complicated manipulation with an increased number of remote control buttons on a remote control unit. Many attempts have been made to improve the maneuverability of control means.

A television broadcast channel selecting device, which is one of basic functions of a television receiver, is now considered. A typical electronic tuner of the TV is used for selecting a broadcast channel by selecting a tuning voltage. The use of this electronic tuner enables a user to easily select a desired broadcast channel by pressing a corresponding channel selecting button on a remote control panel.

Sometimes the user wants to take a quick view of what current programs are broadcast at receivable channels on the TV screen to decide which program to enjoy. In this case, the user has to sequentially select channels by pressing a number of (e.g., ten) channel-selecting buttons on the control panel, recognizing a channel number every time before pressing the buttons. The provision of TV-channel selecting buttons "UP" and "DOWN" is also proposed, which method, however, can not directly select a desired channel and requires repeatedly pressing the button "UP" or "DOWN" until the desired channel number appears. It may take time and labor. Moreover both methods are limited to the number of channels to be selected.

Recently, there has been devised a channel selection aiding method by which a screen of a TV is temporally divided into a plurality of windows and still pictures of different TV broadcast channels are simultaneously displayed one in each window. This method may facilitate the selection of any desired program, but it involves a problem that an increasing number of receivable TV broadcast channels requires more divisions of the TV screen. This makes each window be smaller in area and be harder to recognize a picture displayed therein.

The above-mentioned techniques relate to TV tuners for selecting one of a plurality of receivable broadcast channels. Furthermore, the user of TVs may encounter in many circumstances the similar difficulty to select one from a large number of media or data.

Besides the foregoing remote control functions, selection of a particular one from a large number of things is also achieved by using a matrix switch which selects a particular button existing at one of cross points formed by rows and columns. This switch, however, has the limitation on the number of buttons and requires the user to accurately recognize a desired cross-point in the matrix.

The user interface of a computer terminal has hierarchically-ordered folders that can hold a number of files and can be opened downwards in the hierarchy to select a particular one of files. In this case, folders are successively presented in a two-dimensional plane on a TV monitor. With a large hierarchy containing a large number of folders, there may occur a problem that the screen of the monitor is crowded with the folders overlapping one another. This takes much times to open the folders and makes it harder to find a desired file.

Recently, another method has been proposed, which enables the user to access by means of a mouse to any one of many icons representing representative items in a pseudo-virtual space on a monitor screen to obtain lower-layer icons related to the accessed representative icons. The icons used thereon are difficult to distinguish from one another since they have similar shape with character expressions underneath. In order to promptly select a particular one of many representative icons disposed in the space, the user has to memorize the whereabouts of particular icons to be often selected. Furthermore, since the icons lack three-dimensional shape information, there is no possibility of distinguishing one another by utilizing the depth of space.

In addition, Japanese Laid-open Patent Publication Nos. 7-49764, 7-84746 and 7-114451 disclose methods of displaying icon menu, each of which uses a menu of three-dimensionally represented icons to help the user recognize and select a particular one of many icons. The presentation of icons in the depth in a three-dimensional space, however, is problematic in a that selectable icons may not easily be distinguished and selected. This is because icons disposed in the depth are smaller, and any system for indicating a particular place in the space is quite complicated to the user.

Namely, three-dimensional icons, as compared with conventional two-dimensional icons, are easier to recognize owing to their three-dimensional shape in the depth direction. However, the icons disposed in the depth of the space may be smaller, any place in the three-dimensional space may be frequently designated and it becomes difficult to determine icons which are selectable or to position a cursor on an area of a selectable icon by using a mouse.

The techniques disclosed in Japanese Laid-open Patent Publication Nos. 7-49764 and 7-114451 have common problems in that icons with names indicated underneath, which are arranged in an image of room space, are difficult to designate by a cursor and are too small to be easily distinguished, especially within the depth of the room space. It is difficult to correctly position a cursor over a particular one among a large number of such three-dimensional icons by using a conventional mouse. Consequently, both methods have a limitation on the size and the number of icons to be displayed.

The technique described in Japanese Laid-open Patent Publication No. 7-84746 requires the user to be skilled in manipulating a pointing device for rotating each cube side by side to select one of icons disposed on side surfaces of the cube. The selecting operation is completed. Furthermore, it is also difficult to find a desired icon because icons on surfaces of the cube have no linkage with each other.

SUMMARY OF THE INVENTION

The present invention relates to a media selecting device and more particularly to a media selecting device using icons disposed in a virtual space, and directed to provide a media selecting device which is capable of easily selecting any desired one of a large number of icons representing respective media.

An object of the present invention is to provide a media selecting device for selecting any one of media by selecting a corresponding one of icons representing respective media and contained in one of hierarchical layers, which device comprises: display means for displaying a plurality of icons in one of the hierarchical layers; icon-selecting means for selecting any one of the icons by using a rotary disc type knob that can be turned in both directions to change the displaying order of the icons in both directions; a first change-over switch button for presenting icons in a lower hierarchical layer related to the current selected icon or deciding the current selected icon to select the corresponding medium there through; and a second switch button for cancelling the current selected icon and presenting icons of an upper layer related to the cancelled icon. Namely, the present invention is intended to create a media-selecting device which realizes an excellent visibility of icons and controllability and enables the user to easily select any desired one of icons representing corresponding media on a display screen by turning a selecting knob to point a corresponding position on its scale with no need of positioning a cursor over the icon on the screen and to freely changing a hierarchical layers of icons from up to down and reverse by using at least two buttons "Execute" and "Cancel" (first and second change-over button).

Another object of the present invention is to provide a media selecting device wherein the display presents three-dimensional icons that are easily distinguishable from one another by their three-dimensional shapes and locations in a three-dimensional virtual space on a display screen and, therefore, enables the user to intuitively recognize the location of any desired icon in the virtual space.

Another object of the present invention is to provide a media-selecting device which is capable of displaying an icon selected by the icon selecting mechanism in a clearly distinguishable way (e.g., by changing brightness), thus making easier for the user to select any one of icons on a display screen.

Another object of the present invention is to provide a media selecting device which can be easily adapted to a variety of media selecting applications by setting selectable media (items) at respective icons and which can easily select any one of receivable television broadcast channels by selecting corresponding ones of icons on a display screen.

Another object of the present invention is to provide a media-selecting device which can be easily adapted to a variety of media selecting applications by setting selectable media (items) at respective icons and which can easily select any one of receivable voice broadcast channels by selecting corresponding ones of icons on a display screen.

Another object of the present invention is to provide a media-selecting device which can be easily adapted to a variety of media selecting applications by setting selectable media (items) at respective icons and which can easily select any one of telephone numbers and/or facsimile numbers by selecting corresponding ones of icons on a display screen.

Another object of the present invention is to provide a media-selecting device which can be easily adapted to a variety of media selecting applications by setting selectable media (items) at respective icons and which can easily select any one of audio recording devices by selecting corresponding ones of icons on a display screen.

Another object of the present invention is to provide a media-selecting device which can be easily adapted to a variety of media selecting applications by setting selectable media (items) at respective icons and which can easily select any one of video recording devices by selecting corresponding ones of icons on a display screen.

Another object of the present invention is to provide a media-selecting device which can be easily adapted to a variety of media selecting applications by setting selectable media (items) at respective icons and which can easily select any one of controllers of household electrical appliances by selecting corresponding ones of icons on a display screen.

Another object of the present invention is to provide a media-selecting device which can be easily adapted to a variety of media selecting applications by setting selectable media (items) at respective icons and which can easily select any one of text data by selecting corresponding ones of icons on a display screen.

Another object of the present invention is to provide a media-selecting device which can be easily adapted to a variety of media selecting applications by setting selectable media (items) at respective icons and which can easily select any one of computer processors by selecting corresponding ones of icons on a display screen.

Another object of the present invention is to provide a media-selecting device which can be easily adapted to a variety of media selecting applications by setting selectable media (items) at respective icons and which can easily select any one of application programs by selecting corresponding ones of icons on a display screen.

Another object of the present invention is to provide a media-selecting device which can be easily adapted to a variety of media selecting applications by setting selectable media (items) at respective icons and which can easily select any one of autochangers by selecting corresponding ones of icons on a display screen.

BRIEF DESCRIPTION OF DRAWINGS

FIG. 15 is a block diagram showing an example of construction of a media selecting device according to the present invention.

PREFERRED EMBODIMENTS OF THE INVENTION

Figure 1:
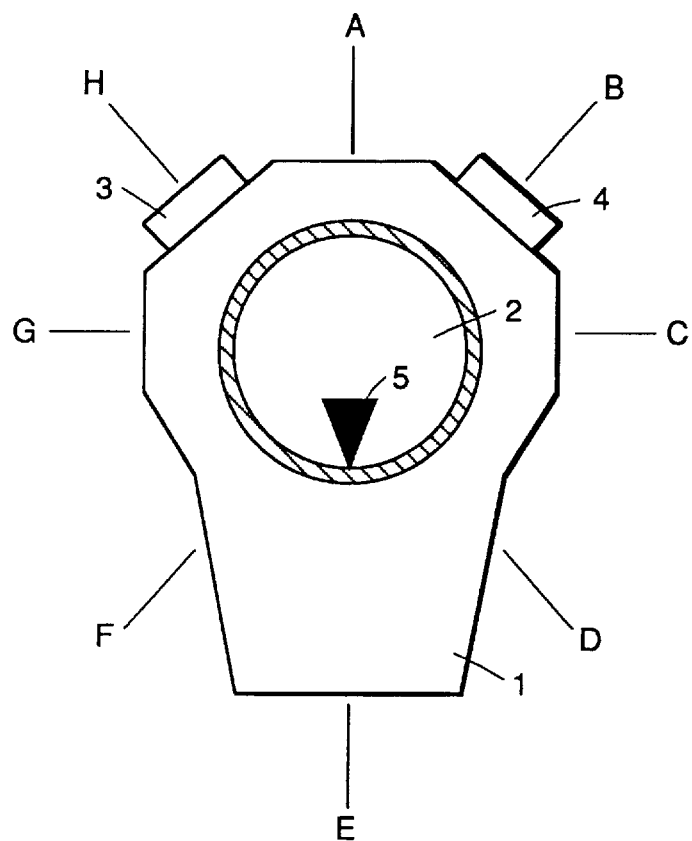
FIG. 1 is a plan view of a media selecting device according to one aspect of the present invention.

A media selecting device according to the present invention is intended to easily select a particular one of media by selecting corresponding one of icons disposed in a three-dimensional space on a display screen, which is provided with a unique media selecting system that can select icons in succession by turning a rotary disc type knob. This media selecting device enables a user to easily select any small icon disposed in the depth of the three-dimensional space with no need of determining which icons are selectable (i.e., eliminating the possibility of selecting an object that can not be selected). The selecting device is simple in construction and easy to operate, allowing the user to select the object in an intuitive way. The hierarchical presentation of lower-layer icons enables the user to easily recognize enlarged icons in the same layer, preventing the display screen from being crowded with a large number of icons overlapping one another. In other words, the media selecting device according to the present invention can present icons at an excellent visibility and which are so easily controlled that they may be recognized at a glance, with any desired one of them easily selected and acknowledged.

As stated above, the problems involved in the prior art devices for selecting three-dimensional icons disposed in a virtual three-dimensional space can be solved by a system including the media selecting device according to the present invention, which device can facilitate the selection of any desired medium by using a rotary disc type knob for selecting corresponding ones of three-dimensional icons representing respective media and displayed in one of the hierarchical layers. To select a desired icon from a menu, for example, the knob is turned to place its pointer at a corresponding position and, then, a button of the knob is pressed to select the medium through that icon.

Namely, the media selecting device according to the present invention has the icon selecting mechanism for selecting any desired one of multiple icons disposed in a three-dimensional virtual space on a display screen, a first change-over button for recognizing the icon selected by the icon selecting mechanism, accessing thereto and displaying icons of a lower layer linked with the accessed icon, and a second change-over button for cancelling current displayed icons and presenting icons of an upper layer in a virtual space on the display screen, wherein the icon selecting mechanism can successively select icons by turning its rotary disk type knob. This enables the user to easily select any desired one of icons representing respective media stored in the corresponding addresses.

The application of the media selecting device according to the present invention enables the user to easily select any one of icons disposed in a three-dimensional virtual space on the display screen by turning the rotary disk type knob and further to display icons of a lower layer or an upper layer related to the selected icon on the display screen by pressing the first or second change-over button. Namely, icons can be easily recognized in a space and in a simply structured hierarchy. This realizes easy selection of any desired one among a large number of items represented by the icons.

Referring the accompanying drawings, preferred embodiments of the present invention will be described below in detail. In drawings, like elements are given like reference numerals throughout, omitting repeated explanation. FIG. 1 is a plan view of a media selecting device according to an aspect of the present invention. This media-selecting device comprises a main body of media selecting device 1, a turning knob 2 for selecting a desired icon, a execution input button (first change-over button) 3 and a cancellation input button (second change-over button) 4. An arrow 5 indicates a selecting direction and characters A–H indicate the direction of the turning knob 2.

Figure 2:
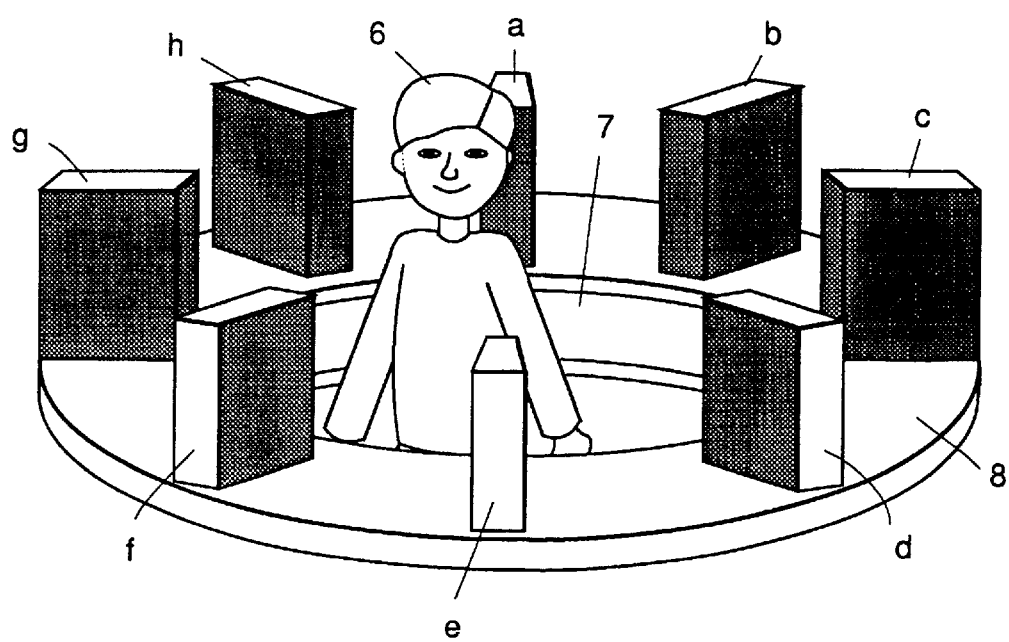
FIG. 2 is a conceptual view showing an example of a virtual reality space image presented by a media selecting device according to one aspect of the present invention.

FIG. 2 is a conceptual illustration of a virtual reality space created on a display screen by a media selecting device according to the present invention. In FIG. 2, there is shown a user 6, a lower round table 7, an upper round table 8 and books a to h (each of them is as a metaphor for an icon).

The virtual reality space is occupied by a user 6 surrounded by a lower round table 7 and a larger upper round table 8 disposed above the lower round table 7 and books a–h placed on the upper round table 8. Each of the books is used as a metaphor for an icon. A rotation amount of the turning knob 2 of the media selecting device (FIG. 1) correctly corresponds to a rotation amount of the upper round table 8 of FIG. 2. Therefore, any desired one of the books a–h disposed in the virtual space can be recognized at a glance therein and intuitively selected by turning the turning knob 2 to position its pointer at corresponding one of the angular positions A to H.

The books may be differently colored or provided with different textures or different background images so that they may be more easily recognized at respective positions on the upper round table 8.

The books as metaphors for icons may be changed by other metaphors, e.g., TV monitors, computer terminals, home pages of an internet, or jackets for compact discs (CDs) depending upon objects that the icons represent. Furthermore, the media selecting device may be provided with an image input means for inputting, e.g., CD jacket images for texture mapping of icons.

Figure 3A:
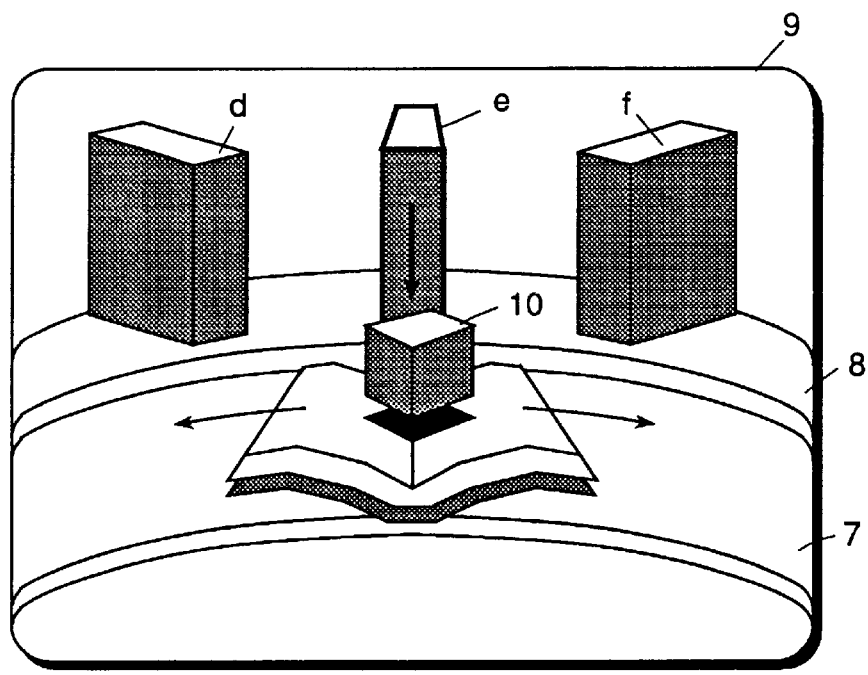
FIGS. 3A and 3B are illustrative of an image, viewed from a view-point of an observer, in the virtual-reality space presented by the media selecting device of FIG. 2.
Figure 3B:
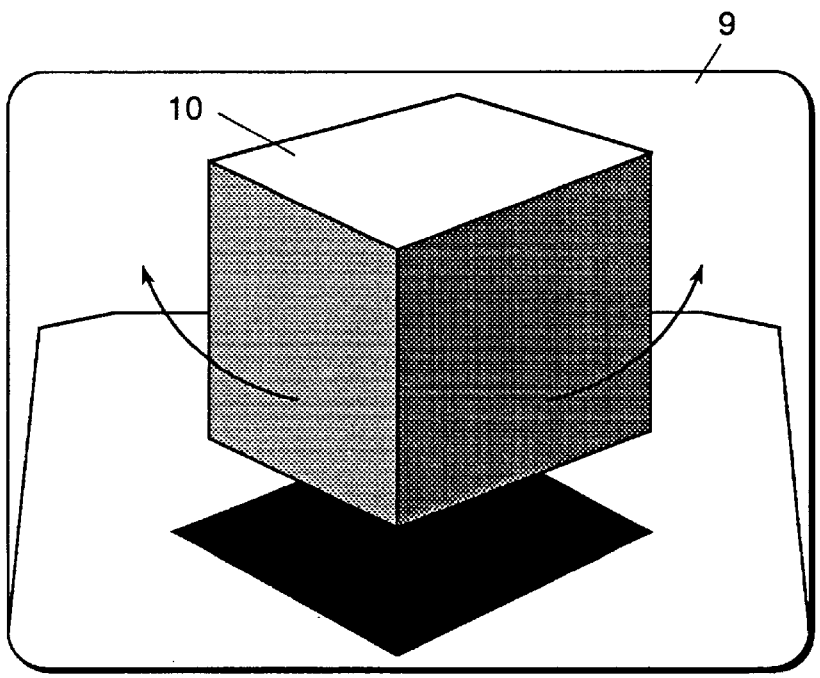

FIG. 3A is illustrative of a virtual reality space image viewed from the viewpoint of the user shown in FIG. 2. In FIGS. 3A and 3B, numeral 9 is a display and numeral 10 is a media content.

In the virtual space presented on a screen of the display 9, there is a user 6 surrounded by lower round table 7 and upper round table 8 on which books (d, e, f) are placed. The book "e" on the screen is selected and visually distinguished when the turning knob 2 of the media selecting device (FIG. 1) is turned to position its arrow 5 at position "E". The execution input button 3 of the media selecting device (FIG. 1) is then pressed to call for a program that in turn is executed to automatically transfer the book "e" onto the lower round table 7 and open that book thereon. The media content 10 is presented above the open pages of the book "e". The cancellation input button 4 of the media selecting device (FIG. 1) is now pressed to cancel the program for the book "e". The book "e" is automatically closed and returned onto the lower round table 7.

FIG. 3B shows the media (FIG. 3A) in an accessed state. In FIG. 3B, there is shown a practical example of the media content 10 of the book "e" that is established by pressing the execution input button 3 of the media selecting device in the state shown in FIG. 3A. The book "e" is accessed and further processable by the user.

In this instance, the media content 10 of the book "e" presented on the display screen represents a three-dimensional model that can be freely turned about its vertical axis (i.e., turnable in horizontal directions). When the cancellation input button 4 of the media selecting device is pressed, accessing to the media content 10 is cancelled and the users' eye is automatically returned to the state shown in FIG. 3A.

Figure 4A:
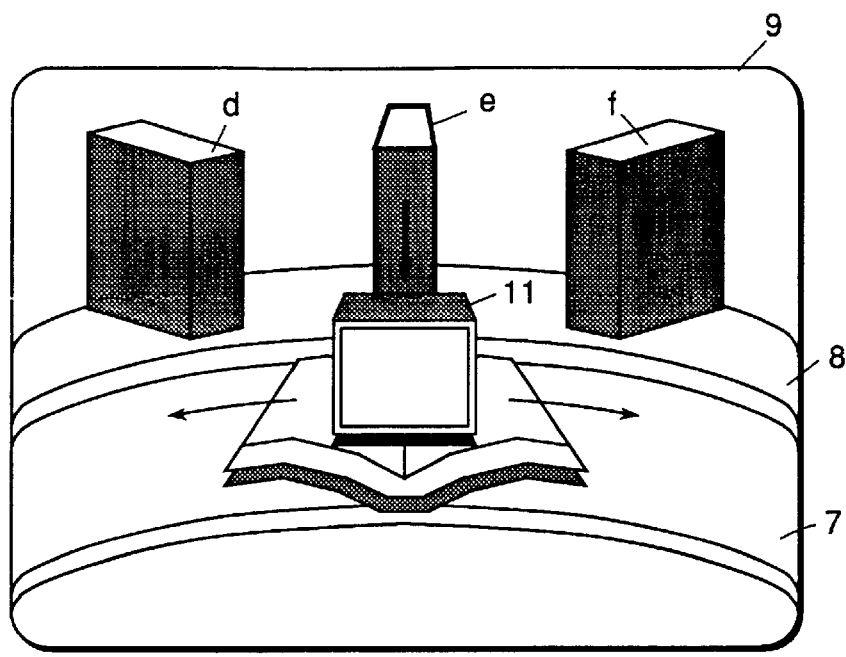
FIGS. 4A and 4B are conceptual illustration of a media selecting device according to another aspect of the present invention, which is used for selecting a particular one of TV broadcast programs.
Figure 4B:
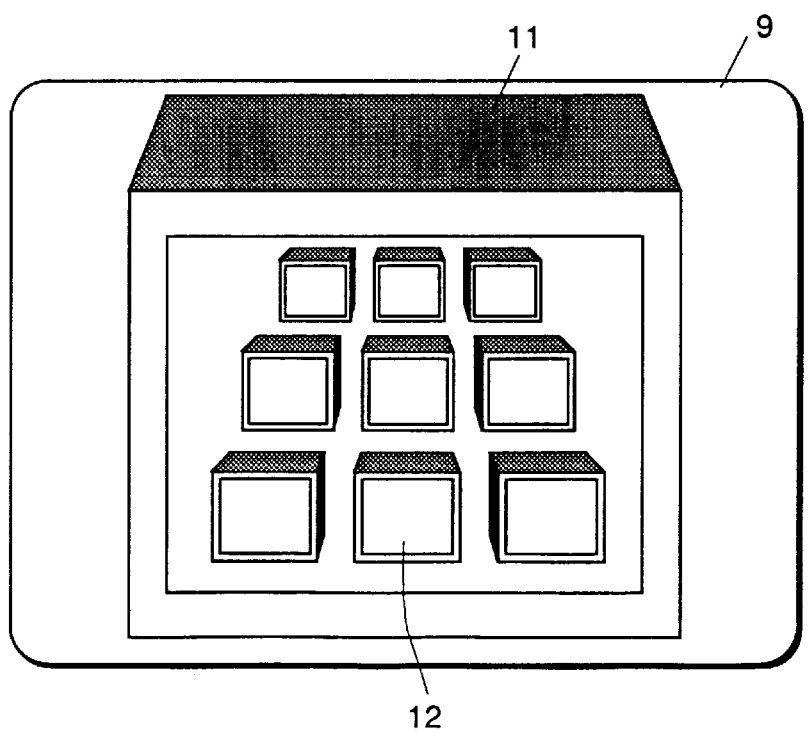

FIGS. 4A and 4B are conceptual views of a media selecting device according to another aspect of the present invention, wherein the media content consists of TV programs. An image seen from the viewpoint of a viewer is presented on a display screen in FIG. 4A and an accessed image is presented in FIG. 4B.

In FIG. 4A, a TV monitor 11 represents a particular genre. In FIG. 4B, there is shown a practical example of an image of the TV monitor 11 automatically accessed by pressing the execution input button 3 after selecting the TV monitor 11 in the stage of FIG. 4A.

Further pressing the execution input button 3 causes a group of TV monitors 12 of a lower hierarchical layer to be presented on the enlarged screen of the TV monitor 11. The turning knob 2 is then turned to select any desired TV monitor among the group of TV monitors 12., whereon a program can be observed. The cancellation input button 4 of the media selecting device is now pressed to cancel a screen image of the group of TV monitors 12. Further pressing the cancellation input button 4 cancels the access to the TV monitor 11 and causes the viewpoint of the viewer to automatically return to the position of FIG. 4A.

Figure 5A:
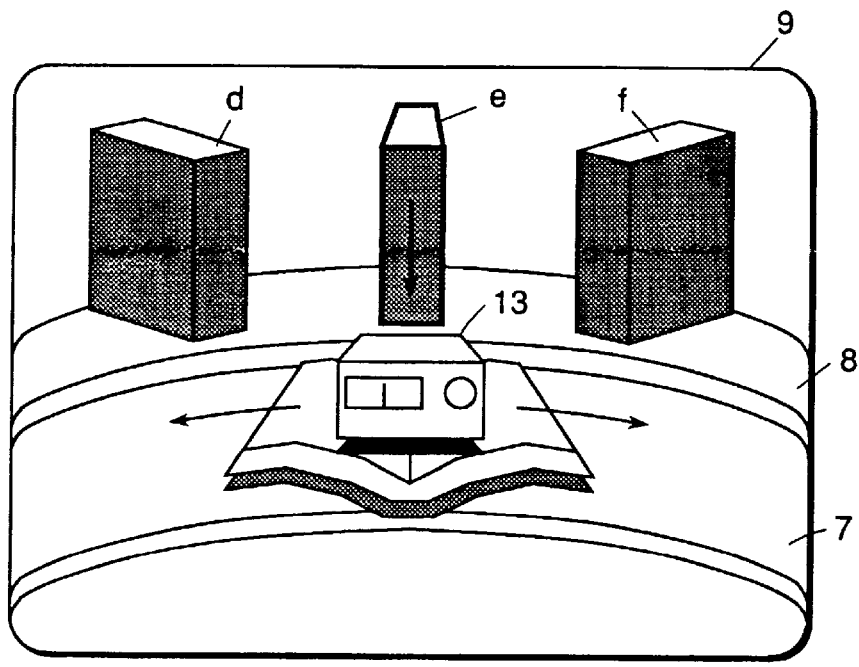
FIGS. 5A and 5B are conceptual illustration of a media selecting device according to another aspect of the present invention, which function corresponds to a tuner of a radio receiver.
Figure 5B:
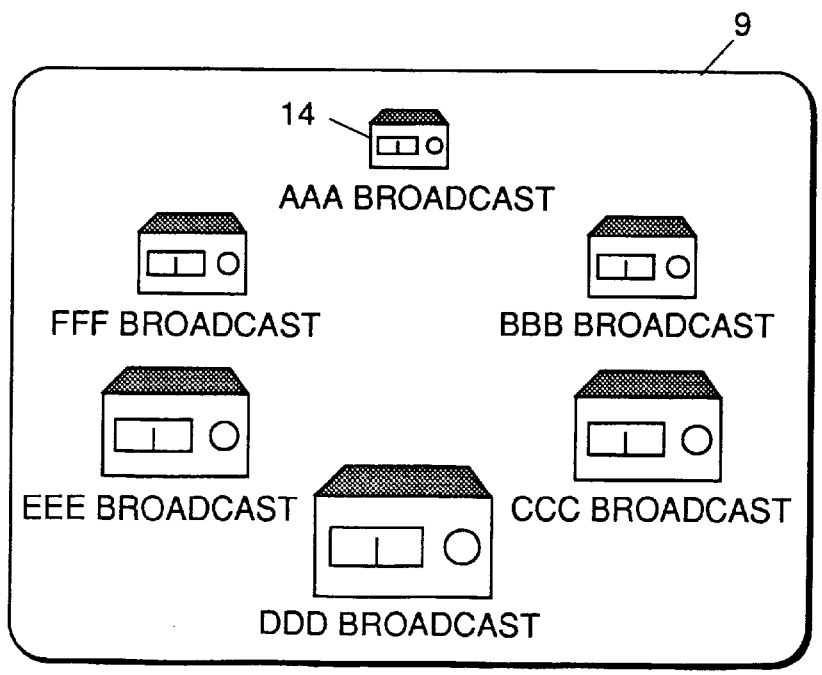

FIGS. 5A and 5B are conceptual views of a media selecting device according to another aspect of the present invention, wherein the media content consists of radio tuners. An image seen from the viewpoint of a viewer is presented on a display screen in FIG. 5A and an accessed image is presented in FIG. 5B. In FIGS. 5A and 5B, numeral 13 is a radio tuner and numeral 14 is a group of radio tuners.

In FIGS. 5A and 5B, there are shown practical examples of a method for selecting any desired one of radio tuners 14 representing respective broadcast channels. The operation is the same as described in the case of FIG. 4B.

Figure 6A:
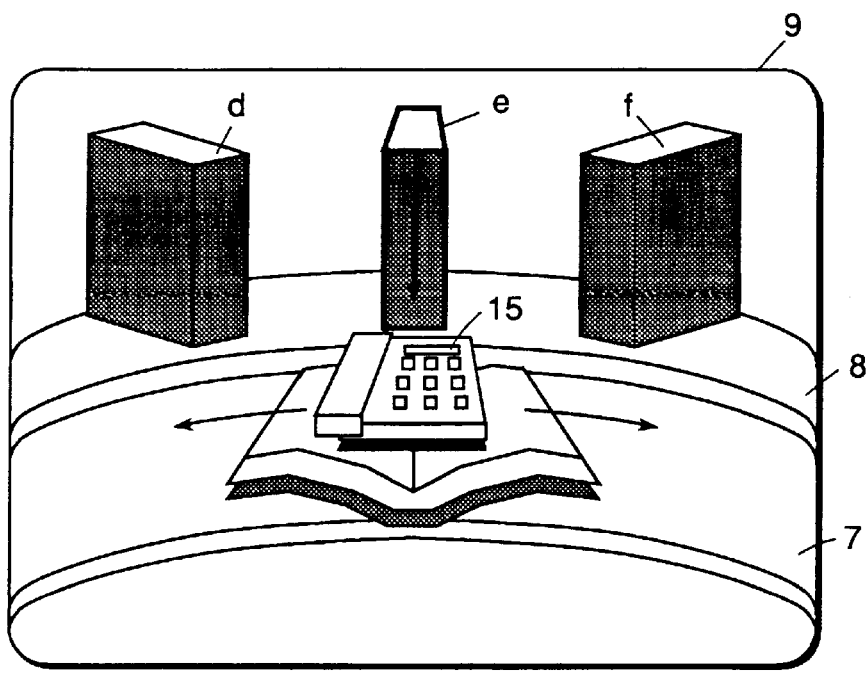
FIGS. 6A and 6B are conceptual illustration of a media selecting device according to another aspect of the present invention, which media content consists of telephone sets.
Figure 6B:
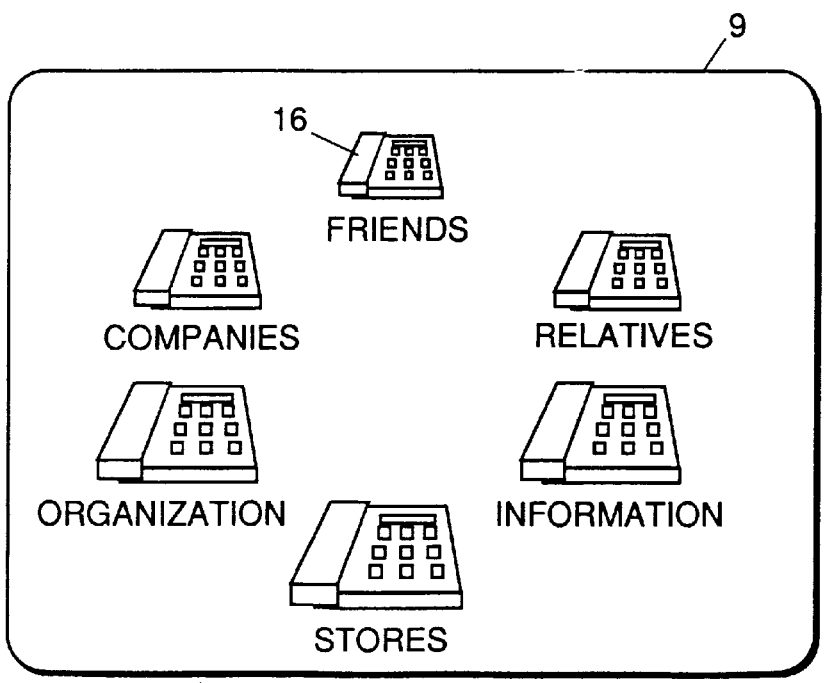

FIGS. 6A and 6B are conceptual views of a media selecting device according to another aspect of the present invention, wherein the media content consists of telephone sets. An image seen from the viewpoint of a viewer is presented on a display screen in FIG. 6A and an accessed image is presented in FIG. 6B. In these figures, numeral. 15 is a telephone set and numeral 16 is a group of telephone sets.

In FIGS. 6A and 6B, there are shown practical examples of a method for dialing any desired one of telephone sets 16. The operation is the same as described in the case of FIG. 4B.

Figure 7A:
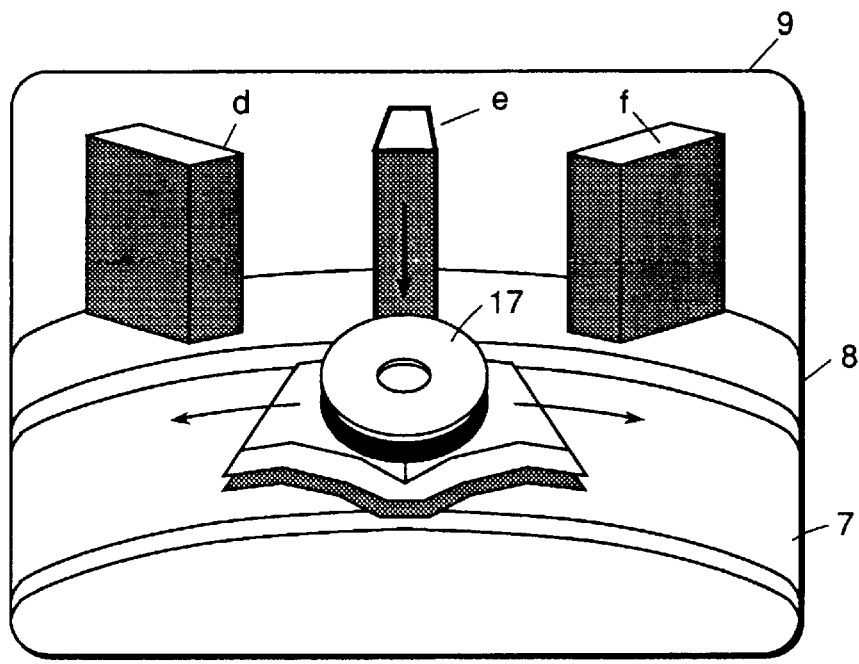
FIGS. 7A and 7B are conceptual illustration of a media selecting device according to another aspect of the present invention, which media content consists of CD player sets.
Figure 7B:
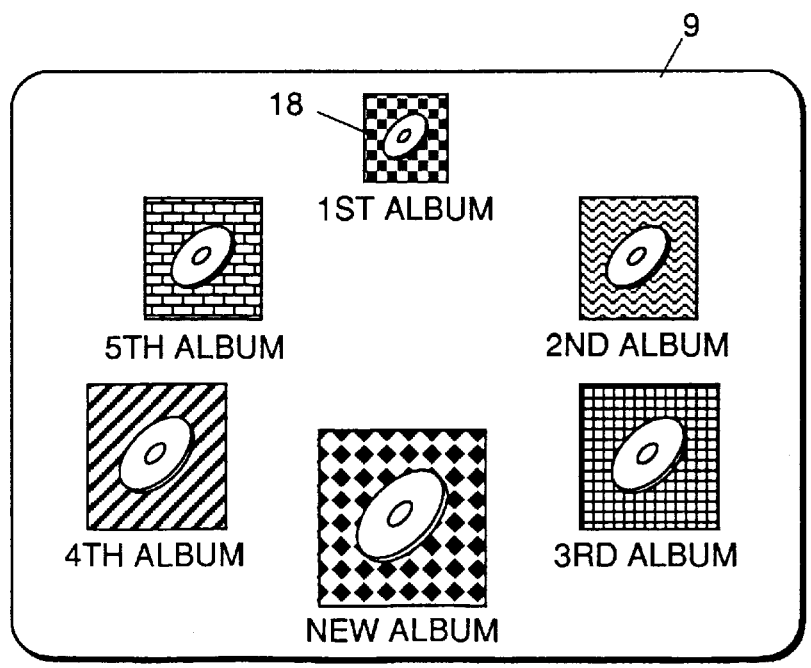

FIGS. 7A and 7B are conceptual views of a media selecting device according to another aspect of the present invention, wherein the media content consists of a CD player and compact disks (CDs). An image seen from the viewpoint of a viewer is presented on a display screen in FIG. 7A and an accessed image is presented in FIG. 7B. In these figures, numeral 17 is a CD player and numeral 18 is a group of CDs.

In FIGS. 7A and 7B, there are shown practical examples of a method for selecting and enjoying any desired one of compact disks 18. The operation is the same as described in the case of FIG. 4B.

Figure 8A:
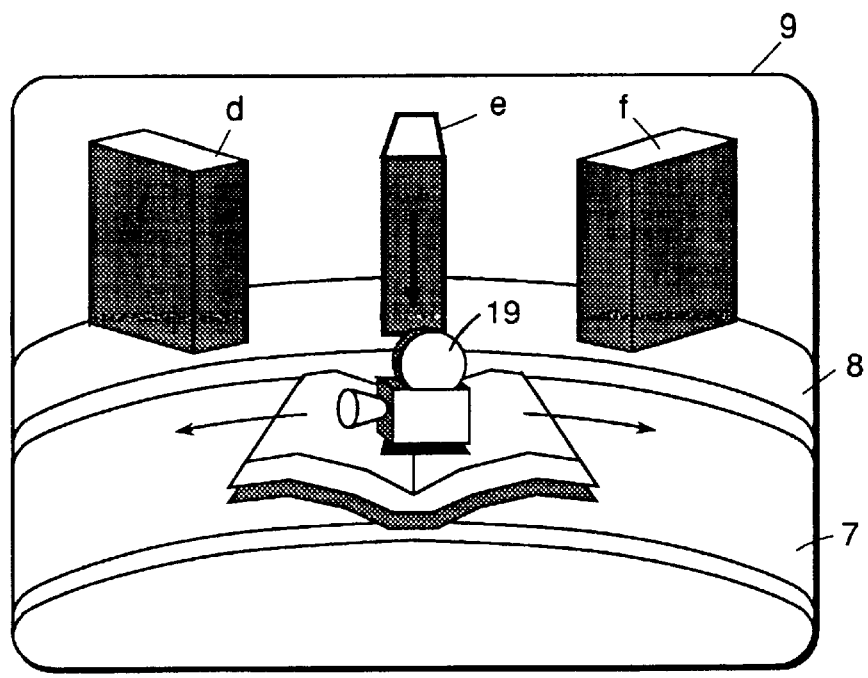
FIGS. 8A and 8B are conceptual illustration of a media selecting device according to another aspect of the present invention, which media content consists of video player sets.
Figure 8B:
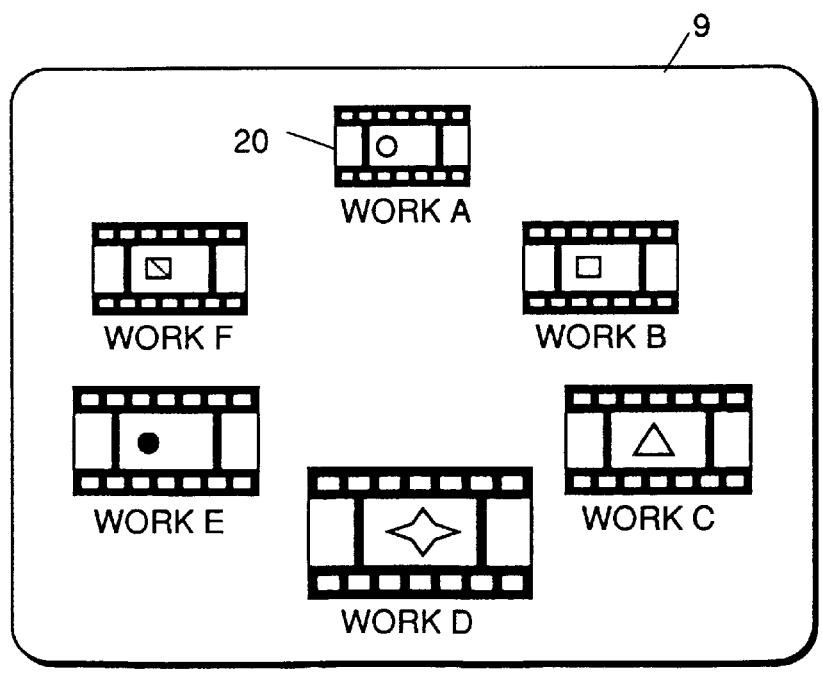

FIGS. 8A and 8B are conceptual views of a media selecting device according to another aspect of the present invention, wherein the media content consists of a video player and video programs. An image seen from the viewpoint of a viewer is presented on a display screen in FIG. 8A and an accessed image is presented in FIG. 8B. In these figures, numeral 19 is a video player and numeral 20 is a group of video programs.

In FIGS. 8A and 8B, there are shown practical examples of a method for selecting and reproducing any desired one of video programs 20. The operation is the same as described in the case of FIG. 4B.

Figure 9A:
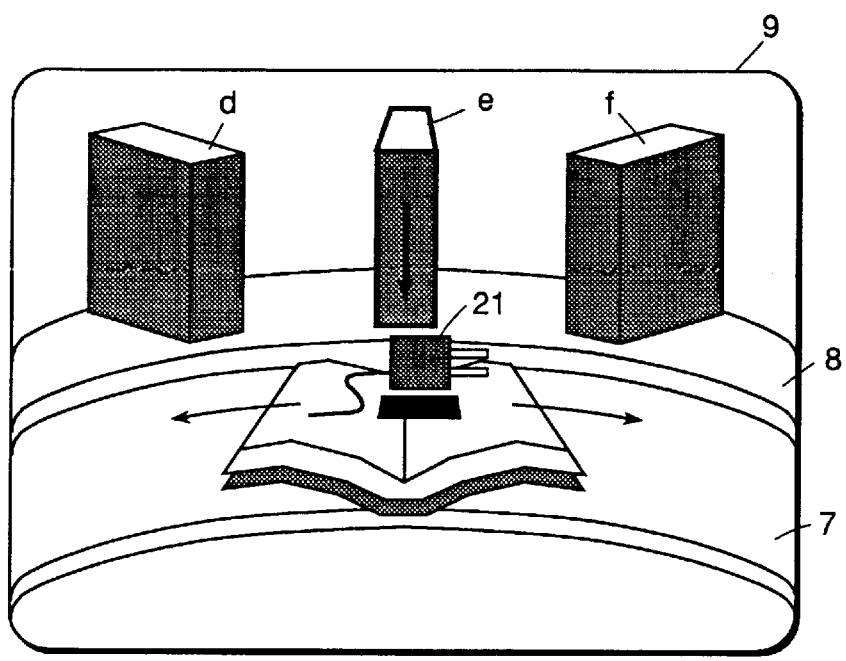
FIGS. 9A and 9B are conceptual illustration of a media selecting device according to another aspect of the present invention, which media content consists of home automation controller.
Figure 9B:
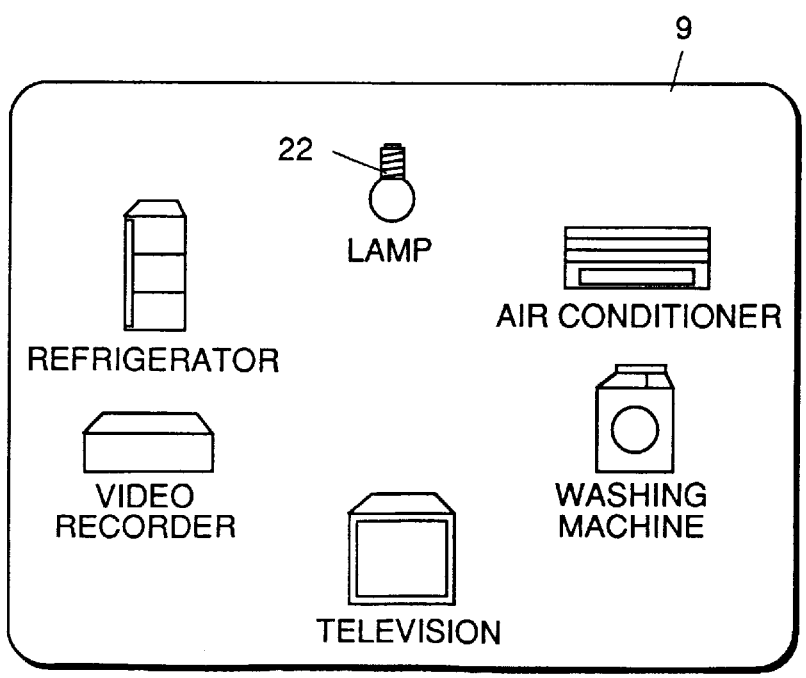

FIGS. 9A and 9B are conceptual views of a media selecting device according to another aspect of the present invention, wherein the media content consists of a home automation controller and objects to be controlled by the controller. An image seen from the viewpoint of a viewer is presented on a display screen in FIG. 9A and an accessed image is presented in FIG. 9B. In these figures, numeral 21 is a home automation controller and numeral 22 is a group of household electrical appliances.

In FIGS. 9A and 9B, there are shown practical examples of a method for turning on and off the power source of any one of household electrical appliances 22. The operation is the same as described in the case of FIG. 4B.

Figure 10A:
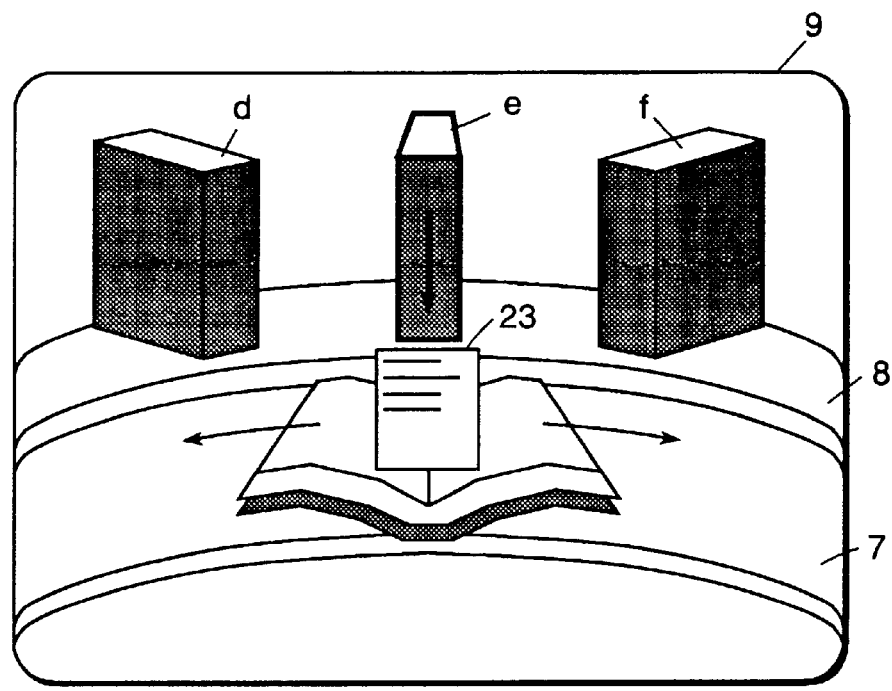
FIGS. 10A and 10B are conceptual illustration of a media selecting device according to another aspect of the present invention, which media content consists of text information.
Figure 10B:
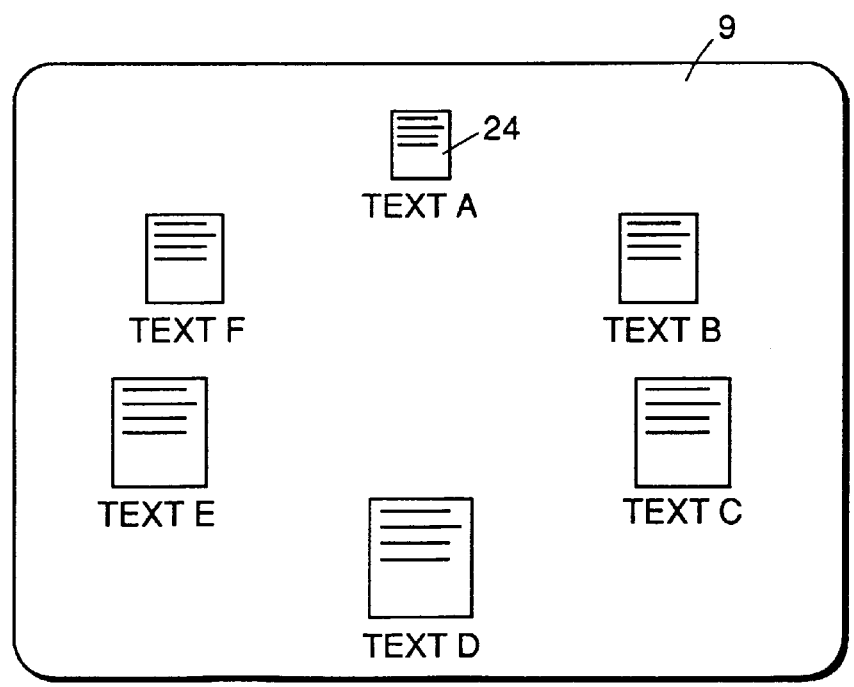

FIGS. 10A and 10B are conceptual views of a media selecting device according to another aspect of the present invention, wherein the media content consists of text information. An image seen from the viewpoint of a viewer is presented on a display screen in FIG. 10A and an accessed image is presented in Fig. 10B. In these figures, numeral 23 is text information and numeral 24 is pieces of text information.

In FIGS. 10A and 10B, there are shown practical examples of a method for presenting any desired text among the pieces of text information 24. The operation is the same as described in the case of FIG. 4B.

Figure 11A:
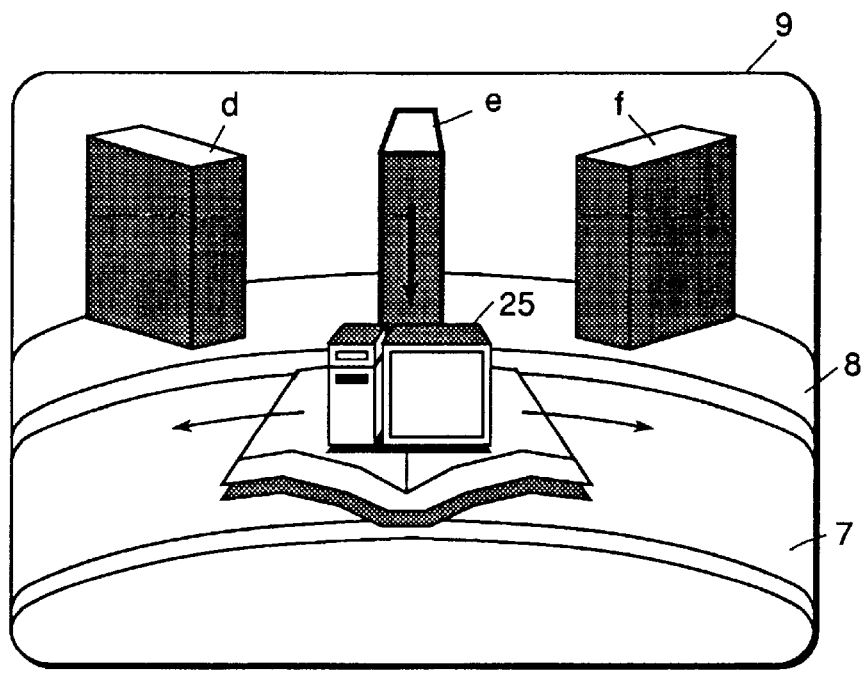
FIGS. 11A and 11B are conceptual illustration of a media selecting device according to another aspect of the present invention, which media content consists of computing processors.
Figure 11B:
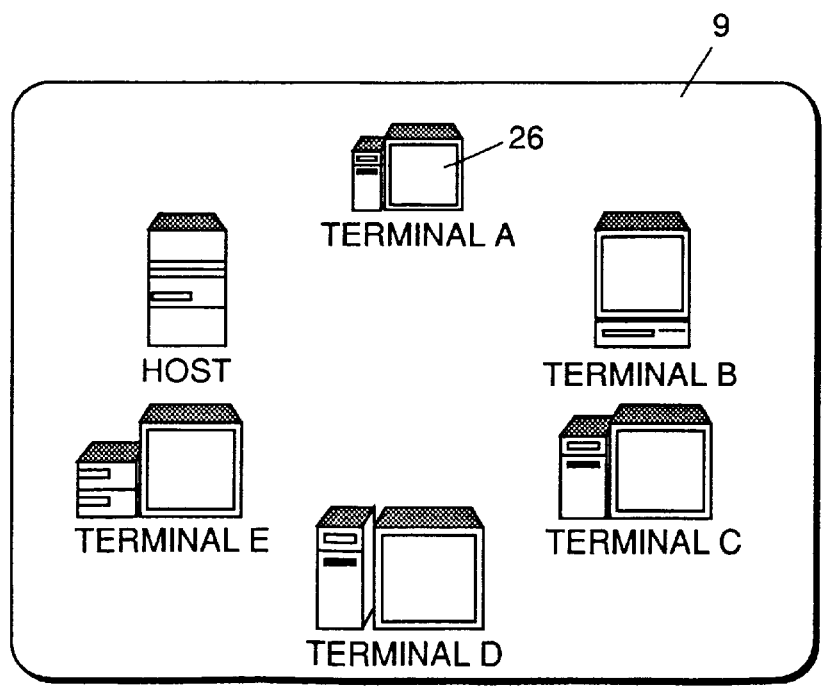

FIGS. 11A and 11B are conceptual views of a media selecting device according to another aspect of the present invention, wherein the media content consists of personal computers. An image seen from the viewpoint of a viewer is presented on a display screen in FIG. 11A and an accessed image is presented in FIG. 11B. In these figures, numeral 25 is a computer processor and numeral 26 is a group of computers processors.

In FIGS. 11A and 11B, there are shown practical examples of a method for accessing any one of computer processors 26. The operation is the same as described in the case of FIG. 4B.

Figure 12A:
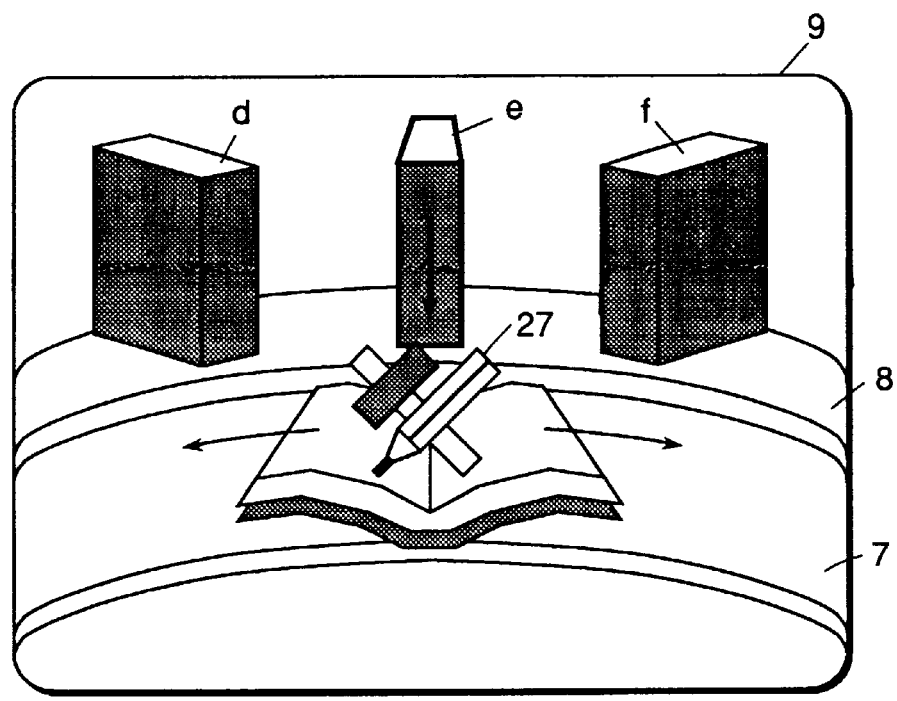
FIGS. 12A and 12B are conceptual illustration of a media selecting device according to another aspect of the present invention, which media content consists of application programs.
Figure 12B:
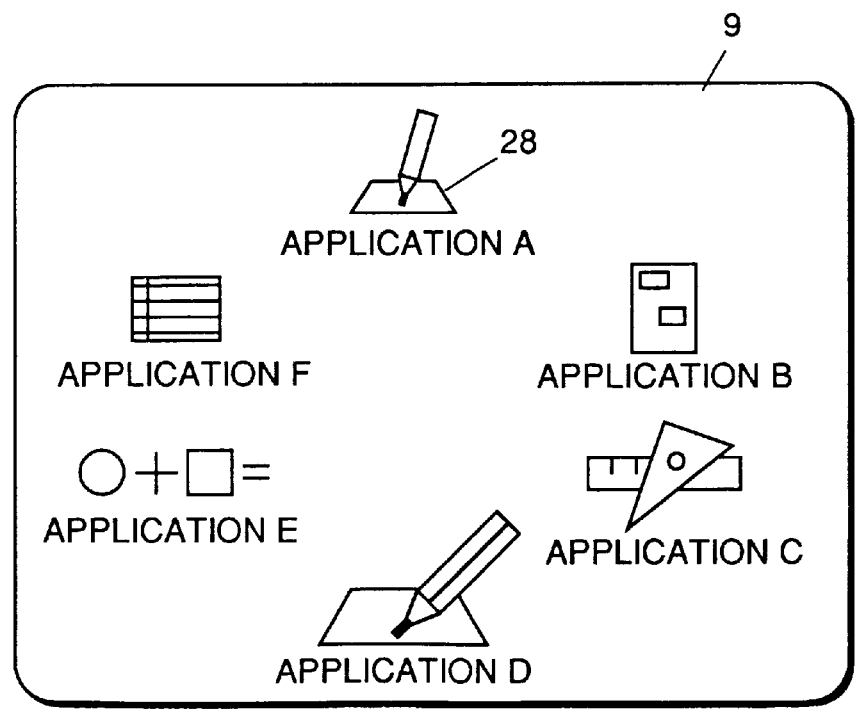

FIGS. 12A and 12B are conceptual views of a media selecting device according to another aspect of the present invention, wherein the media content consists of application programs. An image seen from the viewpoint of a viewer is presented on a display screen in FIG. 12A and an accessed image is presented in FIG. 12B. In these figures, numeral 27 is an application program and numeral 28 is a group of application programs.

In FIGS. 12A and 12B, there are shown practical examples of a method for start any one of application programs 28. The operation is the same as described in the case of FIG. 4B.

Figure 13A:
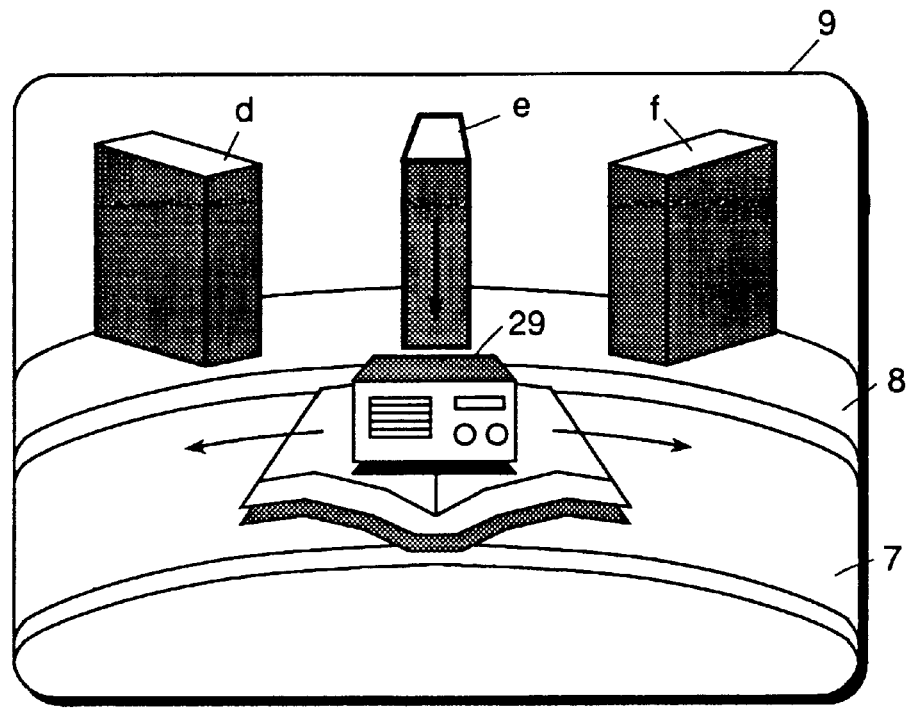
FIGS. 13A and 13B are conceptual illustration of a media selecting device according to another aspect of the present invention, which media content consists of auto-changers.
Figure 13B:
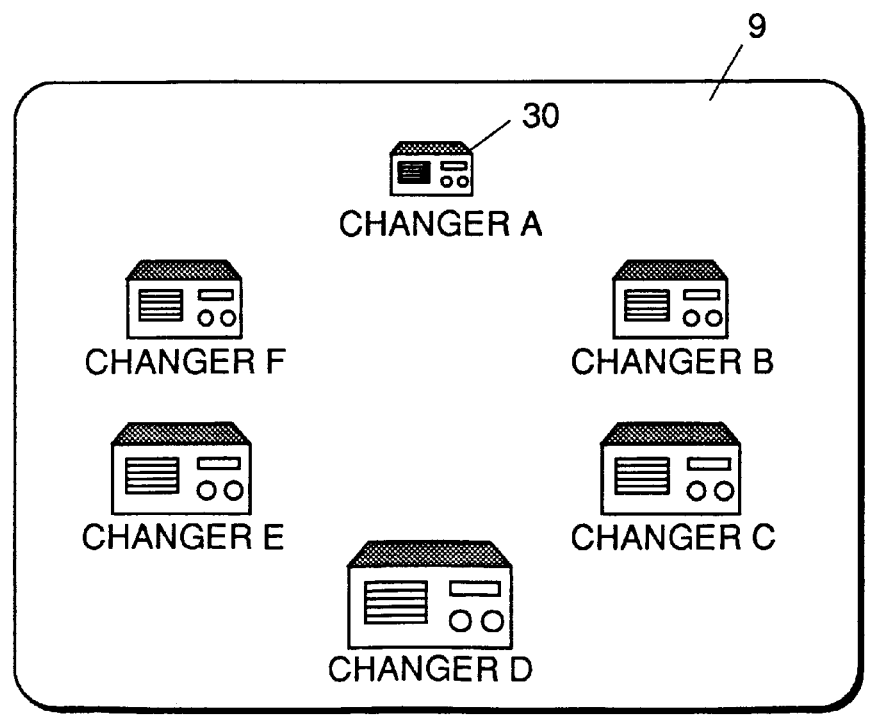

FIGS. 13A and 13B are conceptual views of a media selecting device according to another aspect of the present invention, wherein the media content consists of autochanger device. An image seen from the viewpoint of a viewer is presented on a display screen in FIG. 13A and an accessed image is presented in FIG. 13B. In these figures, numeral 29 is an auto-changer and numeral 30 is a group of auto-changers.

In FIGS. 13A and 13B, there are shown practical examples of a method for reproducing a medium on any one of auto-changers 30. The operation is the same as described in the case of FIG. 4B.

Figure 14A:
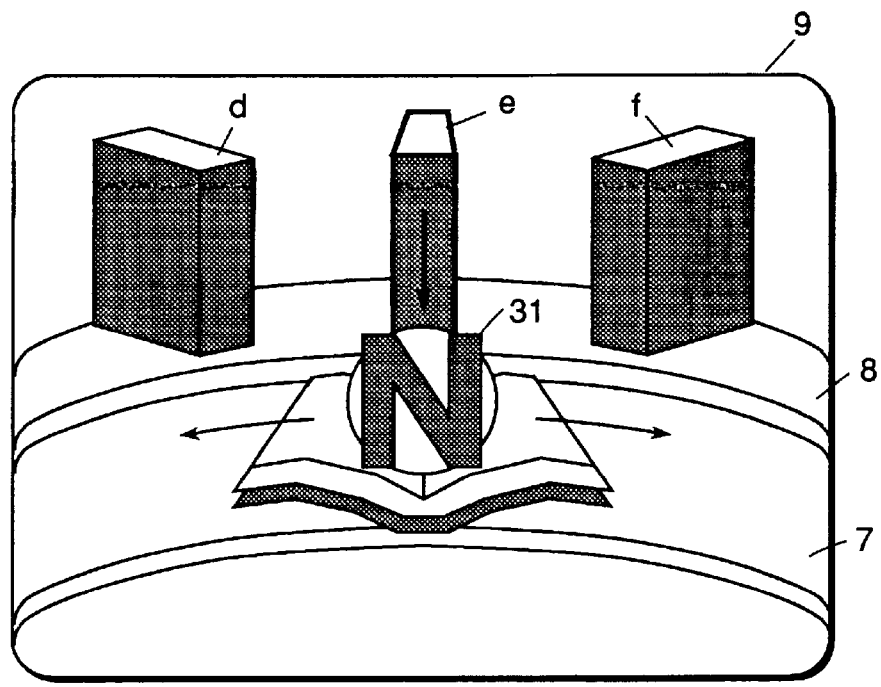
FIGS. 14A and 14B are conceptual illustration of a media selecting device according to another aspect of the present invention, which media content consists of browser programs of an internet.
Figure 14B:
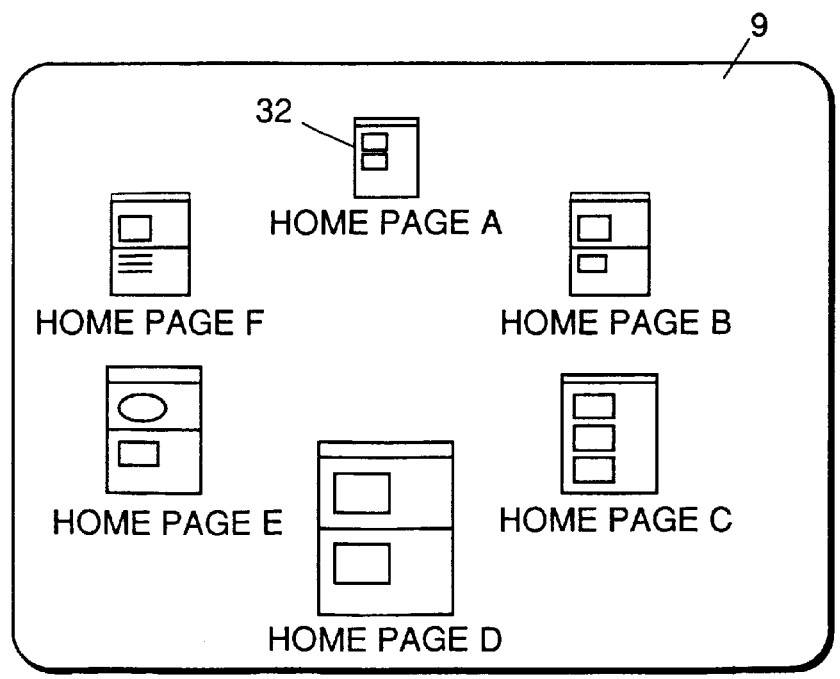

FIGS. 14A and 14B are conceptual views of a media selecting device according to another aspect of the present invention, wherein the media content consists of browser program. An image seen from the viewpoint of a viewer is presented on a display screen in FIG. 14A and an accessed image is presented in FIG. 14B. In these figures, numeral 31 is a browser program and numeral 32 is a group of home pages.

In FIGS. 14A and 14B, there are shown practical examples of a method for displaying any one of home pages 32. The operation is the same as described in the case of FIG. 4B.

FIG. 15 is a block diagram showing a construction of a media selecting device according to the present invention. In FIG. 15, a main body of the media selecting device 33 is composed of a rotation amount detecting means 34 for detecting a rotation amount of a turning knob for selecting any one of various kinds of media, an execute command input means 35 for inputting a command to execute the selection and a cancel command input means 36 for inputting a command to cancel the selection. A signal control portion 37 converts a signal received from the media selecting device into a software suitable signal and controls the converted signal. The signal control portion 37 includes a command signal control portion 38 for controlling a command signal transmitted from the media selecting device, and a peripheral device control portion 39 for controlling peripheral devices 40 according to the signal given from the command signal control portion 38. Then, an image processing portion 42 performs operations on an image to be presented according to the signal from the command signal control portion 38, and loads data from an external storage 41 when required. An image synthesizing portion 43 synthesizes an image from an image generated by the image processing portion 42 and an image transferred from the peripheral device 40 under the control of the peripheral device control portion 39. A display control portion 44 controls the image synthesized by the image synthesizing portion 43 so that it can be presented on a display 45. A speaker 46 supplies a speech signal received from the peripheral device 40.

The following description relates to an exemplified construction of a media selecting device according to the present invention, which is intended to select any desired one of TV broadcast channels.

The media selecting device comprises: an electronic tuner for receiving television broadcast waves, selecting a television broadcast signal of a particular broadcast channel by means of a tuning voltage, and for demodulating the signal; a first channel-select voltage generating circuit for generating tuning voltage signals of respective channels for the electronic tuner in a specified order; a second channel-select voltage generating circuit for generating a tuning voltage selected for the electronic tuner by assigning a television broadcast channel to an icon of a media selecting device; a channel-select voltage switching circuit for selecting a tuning voltage of the first or second channel-select voltage generating circuits, and for sending it to the electronic tuner; a small icon generating mechanism for sampling TV signals outputted by the electronic tuner at a specified period, performing time compression and for thinning out horizontal scanning lines; an image memory for storing image signals outputted by the small icon generating mechanism into addresses corresponding to respective channel numbers; a selected state displaying circuit for visually indicating the selected state of an icon according to an instruction of the icon selecting mechanism; and a selected state indication synthesizing circuit for combining a still picture of each channel stored in the image memory with the selected state indication received from the icon selecting mechanism.

Additionally, there is an exemplified construction of a media selecting device according to the present invention, which is intended to select any one of voice broadcast channels.

The media selecting device comprises: an electronic tuner for receiving voice broadcast waves, and selecting a voice signal of a particular voice-broadcast channel by using a tuning voltage and for demodulating the signal; a first channel-select voltage generating circuit for generating tuning voltage signals of respective channels for the electronic tuner in a specified order; a second channel-select voltage generating circuit for generating a tuning voltage selected for the electronic tuner by assigning the voice broadcast channel to an icon of a media selecting device; a channel-select voltage switching circuit for selecting a tuning voltage of the first or second channel-select voltage generating circuit, and for sending it to the electronic tuner; a small icon generating mechanism for generating a small icon from a voice broadcast signal outputted by the electronic tuner; an image memory for storing image signals outputted by the small icon generating mechanism into addresses corresponding to respective channel numbers; a selected state displaying circuit for visually indicating a selected state of an icon according to an instruction of the icon selecting mechanism; and a selected state indication synthesizing circuit for combining a small icon of each channel stored in the image memory with the selected state indication received from the icon selecting mechanism.

A media selecting device according to one aspect of the present invention can easily select any desired one of icons representing corresponding media on a display screen by setting a pointer of a turning knob at a corresponding position on its scale with no need of positioning a cursor over the icon on the screen. The device is also provided with at least two buttons "Execute" and "Cancel" (first and second change-over button) for freely changing-over hierarchical layers of icons from up to down and reverse, making the hierarchical structure of icons be very simple. The media selecting device is thus excellent in visibility and control.

In a media selecting device according to another aspect of the present invention, icons can be easily distinguished from one another by their three-dimensional shapes, and by their locations in a three-dimensional virtual space on a display screen. This enables a user to intuitively recognize the location of any desired icon in the virtual space.

A media selecting device according to another aspect of the present invention has an increased visibility of icons, enabling the user to easily select any one of icons on a display screen.

According to aspects of the present invention, it is possible to create a variety of media selecting devices adapted to a variety of applications by linking icons with various kinds of media or apparatus.

What is claimed is:

1. A media selecting device comprising:
    a display for displaying a plurality of three-dimensional icons existing in the same hierarchical layer;
    an icon-selecting mechanism for selecting any one of said plurality of three-dimensional icons by using a rotatable disc type knob so that a displayed order of said three-dimensional icons are changeable in at least two directions;
    a first change-over button for providing icons of a lower hierarchical layer related to a currently selected three-dimensional icon; and
    a second change-over button for canceling the currently selected three-dimensional icon and for providing icons of an upper hierarchical layer related to said cancelled icon, wherein icons of said upper and lower hierarchical layers are displayed simultaneously without overlap on a screen of said display.

2. A media selecting device as defined in claim 1, wherein said plurality of three-dimensional icons further provide specified three-dimensional shape and three-dimensional location information, said shape and location disposed in a three-dimensional virtual space within said display and operated based on the selection of one of said plurality of three-dimensional icons.

3. A media selecting device as defined in claim 1, wherein said icon selected by said icon selecting mechanism is distinguished from other three-dimensional icons by a variety of visually expressing techniques including changing brightness.

4. A media selecting device as defined in claim 1, wherein said selectable media include television broadcast channels preset to respective three-dimensional icons so that any one of said television broadcast channels can be selected by selecting its corresponding icon.

5. A media selecting device as defined in claim 1, wherein said selectable media include voice broadcast channels preset to respective three-dimensional icons so that any one of said voice broadcast channels can be selected by selecting its corresponding icon.

6. A media selecting device as defined in claim 1, wherein said selectable media include telephone and/or facsimile numbers preset to respective three-dimensional icons so that any one of said telephone and/or facsimile numbers can be selected by selecting its corresponding icon.

7. A media selecting device as defined in claim 1, wherein said selectable media include audio recording devices preset to respective three-dimensional icons so that any one of said audio recording devices can be selected by selecting its corresponding icon.

8. A media selecting device as defined in claim 1, wherein said selectable media include video recording devices preset to respective three-dimensional icons so that any one of said video recording devices can be selected by selecting its corresponding icon.

9. A media selecting device as defined in claim 1, wherein said selectable media include household electrical-appliance controllers preset to respective three-dimensional icons so that any one of said household electrical-appliance controllers can be selected by selecting its corresponding icon.

10. A media selecting device as defined in claim 1, wherein said selectable media include text data preset to respective three-dimensional icons so that any one of said text data can be selected by selecting its corresponding icon.

11. A media selecting device as defined in claim 1, wherein said selectable media include computer processors preset to respective three-dimensional icons so that any one of said computer processors can be selected by selecting its corresponding icon.

12. A media selecting device as defined in claim 1, wherein said selectable media include application programs preset to respective three-dimensional icons so that any one of said application programs can be selected by selecting its corresponding icon.

13. A media selecting device as defined in claim 1, wherein said selectable media include autochangers preset to respective three-dimensional icons so that any one of said autochangers can be selected by selecting its corresponding icon.

14. A media selecting device for use with a display to select one from a plurality of selectable media, comprising:
    a main body having upper and lower ends thereof;
    a rotatable knob at a center of said main body for selecting one of a plurality of three-dimensional icons displayed on the display;
    a first selector located on said upper end of said main body for providing icons of a lower-hierarchical layer which are associated with said selected three-dimensional icon; and
    a second selector located on said upper end of said main body for canceling said selected three-dimensional icon, and for providing icons of an upper-hierarchical layer which are associated with said cancelled three-dimensional icon,
    wherein icons of said upper and lower-hierarchical layers are simultaneously displayed without overlap on a screen of the display, and wherein said rotatable knob and selectors enable a user to freely select hierarchical layers of a desired medium without the need to position a cursor over an icon on said screen.

15. The media selecting device of claim 14, said plurality of three-dimensional icons providing specified shape and location information disposed within a three-dimensional virtual space of the display, said specified shape and location information accessed based on said selected three-dimensional icon.

16. The media selecting device of claim 14, said selected icon distinguished from said plurality of three-dimensional icons through a variety of visually expressing means including adjusting brightness of said selected icon.

17. The media selecting device of claim 1, said first change-over button for deciding upon said currently selected icon to obtain its corresponding medium therethrough.

18. A method for selecting a desired medium from a plurality of selectable media, comprising:
    detecting rotation amount of a rotatable knob;
    selecting a desired medium based on said detected amount, said selected medium represented by a three-dimension icon on a display;
    inputting a command to execute said selected three-dimensional icon to said display by providing icons of a lower-hierarchical layer associated with said selected three-dimensional icon on said display;
    inputting a command to cancel said selected three-dimensional icon to said display by providing icons of an upper-hierarchical layer which are associated with said cancelled three-dimensional icon, said icons of said upper and lower hierarchical layers simultaneously displayed without overlap; and
    converting said commands into signals suitable for control of said selected three-dimensional icon, said steps of detecting, selecting, inputting and converting performed without the need to position a cursor over said three-dimensional icon on a screen of said display.

19. The method of claim 18, said steps of inputting commands further controlling image processing, image synthesizing and display operations for said selected three-dimensional icon corresponding to said desired medium, and peripheral devices attached thereto.

20. A method of selecting one from a plurality of selectable media displayed on a display, comprising:

rotating a selection knob which corresponds to a plurality of three-dimensional images on said display;

selecting one of said plurality of three-dimensional icons displayed on the display;

providing icons of a lower-hierarchical layer which are associated with said selected three-dimensional icon on said display; and canceling said selected three-dimensional icon by providing icons of an upper-hierarchical layer which are associated with said cancelled three-dimensional icon, said icons of said upper and lower hierarchical layers simultaneously displayed without overlap, thereby enabling a user to freely select hierarchical layers of a desired medium without the need to position a cursor over an icon on a screen of the display.

21. The method of claim 20, said steps of providing icons of an upper-hierarchical layer and a lower hierarchical layer further including:

displaying icons of said upper hierarchical layer at a first location on said screen; and displaying icons of said lower hierarchical layer at a second location on said screen, said first and second locations spaced vertically and in depth from one another on said screen so that each layer is simultaneously displayed without overlap.

22. The method of claim 21, said first and second locations surrounding a user in a three-dimensional virtual space.

23. The media selecting device of claim 1, wherein shapes of said displayed three-dimensional icons correspond to shapes of a plurality of selectable media.

24. The media selecting device of claim 14, wherein shapes of said displayed three-dimensional icons correspond to shapes of a plurality of selectable media.

25. The method of claim 18, said selected medium represented by a correspondingly shaped medium on said display.

* * * * *